United States Patent Office 3,560,403
Patented Feb. 2, 1971

3,560,403
PERSISTENT ANTIFOAM COMPOSITIONS AND METHODS OF MAKING SAME UTILIZING DIALKYLAMINO ORGANOSILICONE FLUIDS
Matthew J. O'Hara, Spring Valley, and Donald R. Rink, Yorktown Heights, N.Y., assignors to Union Carbide Corporation, a corporation of New York
No Drawing. Filed Aug. 11, 1967, Ser. No. 659,871
Int. Cl. B01d 19/04
U.S. Cl. 252—358
9 Claims

ABSTRACT OF THE DISCLOSURE

Antifoam compositions having persistent effectiveness especially in aqueous alkaline medium, said compositions being a mixture containing an organosiloxane liquid polymer or other non-aqueous liquid, such as, a hydrocarbon oil or a polyoxyalkylene glycol, and a hydroxyl containing, finely divided, inorganic filler, such as, silica, aluminum oxide and titanium dioxide, reacted with a dialkylamino organosilicone fluid, such as those of the formula $(R'_2N)_x(SiR_2O)_nSiR_2(R)_{2-x}$ wherein $x$ is 1 to 2, $n$ is 0 to 40 and R is an alkyl group having 1 to 10 carbon atoms and R' is an alkyl group having 1 to 3 carbon atoms.

---

Processes for producing such persistent antifoam compositions include mixing the organosiloxane liquid polymer or other liquid, the finely divided inorganic filler and the dialkylamino organosilicone fluid to react said filler with said fluid, or first mixing said fluid and said filler together to react them and then mixing the resulting reacted mixture with said liquid polymer or other liquid.

This invention relates to novel antifoam agents which are particularly characterized in retaining their effectiveness in alkaline systems over long periods of time. The invention also relates to novel methods for preparing such antifoam agents, to aqueous alkaline systems containing same, to novel methods of treating inorganic filler for use in same, and to inorganic filler so treated.

It is well known that many antifoams which perform well at the instant of addition or for a short period after addition lose control after a longer period of contact with the foaming system. When antifoams are used as processing aids where short term control is needed, such as in the packaging of liquid products, this property is of little concern. However, in cases where foam is a problem throughout the production and use of the product, antifoam persistence is extremely important. The compounding and application of latex-based carpet backing is a case in point. Foam control is needed during the compounding of the raw latex with fillers and modifying additives. The compound latex is then sold as a ready-to-use material to carpet manufacturers who may use such compound latices within a few days, several weeks or several months after the compounding operation. Ordinarily, such carpet manufacturers use the compounded latex without further antifoam addition. Consequently, it is imperative that the antifoam action of the composition persist throughout the compounding, shipment and storage, as well as throughout the application steps.

Various methods have been proposed in the past for overcoming the loss of foaming control when the organosiloxane polymer antifoam agents are exposed to alkaline aqueous foaming systems. For example, reference is made to U.S. Pat. 3,113,930 wherein it is proposed that the finely divided filler such as silica be treated with a liquid methyl polysiloxane prior to mixing with the organosiloxane polymer in the preparation of the antifoam agent. In this patented process, silica is heated for several hours with a low molecular weight methyl polysiloxane such as octamethylcyclotetrasiloxane and after this prolonged treatment the resulting mixture is allowed to cool. Thereafter it is mixed with a dimethylsiloxane polymeric liquid and heated for a prolonged period of time such as 16 hours at 200° C. The treatment described by this patent is obviously time-consuming and involves heating and cooling cycles which are very costly.

Another proposal for stabilizing organosiloxane polymer antifoam agents is described in U.S. Pat. 3,235,509. This process utilizes an acid condensation catalyst, such as, aluminum chloride, ferric chloride and other metal halides, as well as sulfuric acid which is stated to be not preferred over the above-mentioned halides. The acid nature of the catalyst employed and of the by-products created by inter-reaction of the catalyst with the silica surface imposes the risk of corrosion to processing equipment as well as metallic containers for the resulting antifoam material. Moreover, if the acidic materials are not removed from the antifoam material there is a risk of equilibration of the organosiloxane polymer contained by the antifoam material during and after the heating step, resulting in the production of volatile, low molecular weight siloxane polymers, the evaporation of which can result in viscosity increase thus complicating the compounding and use of the antifoam material with other substances.

The present invention is based on the discovery that antifoam compositions comprising organosiloxane liquid polymers or other non-aqueous liquids, vehicles, or mixtures thereof, and inorganic fillers such as silica can be stabilized against the action of aqueous alkaline foaming media without the necessity of pretreating the filler, without the necessity of heating and cooling cycles. In accordance with this invention, persistent antifoam compositions are obtained by forming, under substantially anhydrous conditions, mixtures of organosiloxane polymeric liquids, or other non-aqueous liquids and finely divided inorganic filler materials, such as silica, having hydroxyl groups on the surface thereof, reacted with a dialkylamino organosilicone fluid.

Heretofore, dialkylamino substituted organosilicon materials have been mixed with curable organopolysiloxane polymers. Examples of such prior usage are disclosed in U.S. Pat. Nos. 3,032,528, 3,133,110 and 3,243,404. In the first two mentioned patents the curable organosiloxane polymer contains reactive groups bonded to silicon, such as, hydroxy groups, alkoxy groups, aryloxy groups and/or hydrogen. The last mentioned patent discloses mixtures wherein the curable organosiloxane polymer is an organopolysiloxane having a viscosity of at least 100,000 centipoises at 25° C. The resulting mixtures disclosed in all of said patents are curable either at room temperature or elevated temperatures to produce elastomeric products and are not at all suitable for antifoam uses.

The organosiloxane liquid polymers employed in this invention can be any of the well known types heretofore employed in the preparation of antifoam compositions. The polymers generally have hydrocarbon groups as substantially the only organo groups bonded to silicon in the ratio of about 1.8 to about 2.2 monovalent hydrocarbon groups free of aliphatic unsaturation per silicon atom. Most preferably, the hydrocarbon group is methyl and the basic unit of the polymer is the dimethylsiloxane unit which constitutes at least 65 mol percent and preferably 97.9 mol percent or more of the siloxane polymer. Other units can be present, such as trimethylsiloxane units which can be present in amounts up to 25 mol percent of the polymer, more preferably, .5 to 3 mol percent of the polymer. In addition, the polymer can contain still other units, such as, monomethylsiloxane units and unsubstituted siloxane units, i.e., $SiO_{4/2}$, in minimum amounts of less than 10 mol percent and preferably below .2 mol percent of the siloxane polymer. Preferred organosiloxane liquid polymers are the trimethylsiloxy endblocked dimethylsiloxane polymers having the formula $Me_3SiO(Me_2SiO)_nSiMe_3$ wherein Me designates the methyl group and $n$ is an integer. The organosiloxane polymer employed herein has a viscosity in the range of about 5 to about 90,000 centistokes measured at 25° C. and, preferably, about 5 to about 1,000 centistokes. Thus, the value of the integer $n$ is such that the siloxane polymer possesses a viscosity within the above-mentioned broad or preferred range.

It has also been discovered that the organosiloxane liquid polymers described above as a component of the novel compositions of this invention can be partly or entirely replaced by other non-aqueous fluids, such as, hydrocarbon oils, polyalkylene glycol oils, polyalklene glycol monoether oils, polyalkylene glycol diether oils and any other nonaqueous oils. For example, the following oils can be employed: polyethylene glycol having an average molecular weight of 570 to 630, a viscosity of 10.5 centistokes at 210° F. and a specific gravity of 1.125 (20/20° C.), polyethylene glycol having an average molecular weight of 6,000 to 7,500, a viscosity of 700 to 900 centistokes at 210° F., methyl monoether of polyethylene glycol having an average molecular weight of 715 to 785, a viscosity of 10.5 at 210° F. and a specific gravity of 1.09 (40/40), mineral oil, tongue oil, polypropylene glycol having an average molecular weight of 1,950 to 2,100 and a specific gravity of 1.0048, the dimethyl diether of polyethylene glycol, the dibutyl diether of polypropylene glycol, mixed polyethylene-polypropylene glycol, ethyl mono- and diethers of such mixed polyethylene-polypropylene glycols, and the like. Substantially any non-aqueous oil which does not substantially interfere with the reaction of the hydroxyl-containing silica and the dialkylamino organo-silicone fluid, under the conditions of preparation and use of the novel compositions with the other components of said compositions, can be employed in place of the organosiloxane liquid polymer. Such oils can have viscosities from 5 to 90,000 centistokes measured at 25° C. and preferably have viscosities of about 5 to about 1,000 centistokes at 25° C.

The finely divided inorganic fillers employed in this invention are finely powdered materials, preferably in essentially anhydrous form, such as, aluminum oxide, titanium dioxide and, preferably, finely divided silicas, such as precipitated, arc or fumed silica. The filler, preferably, has an average particle diameter of about 7 to about 25 millimicrons and, preferably, in the range of about 7 to about 12 millimicrons. A typical precipitated silica is one having a silica content on an anhydrous basis of 98%, a surface area of 300 m.²/g., a pH of 8.5 and a particle size of 13 millimicrons. A typical pyrogenic silica has a silica content of 99.8%, a surface area of 325 m.²/g., a pH of 3.9 and an average particle size of about 7 millimicrons. Such fillers ordinarily have hydroxyl groups on the surface thereof, such hydroxyl groups being either chemically bonded to the filler or in the form of water absorbed on the surface of the filler or both.

The dialkylamino organosilicone fluids useful in producing the novel compositions of this invention are represented by the formula $(R'_2N)_x(SiR_2O)_mSiR(R)_{2-x}$ wherein R is an alkyl group having 1 to 10 carbon atoms and may be the same or different throughout the molecule, R′ is an alkyl group having 1 to 3 carbon atoms and may be the same or different throughout the molecule, $x$ is an integer of 1 to 2, $m$ is an integer of 0 or more and, preferably, 0 to 200. Preferably, the alkyl groups R and R′ are methyl and the amount of dimethylamino, $R'_2N$—, group bonded to silicon of compounds of this description comprise 0.6 to 29 weight percent based on the total weight of the compound. Examples of such compounds include $(Me_2N)_2(SiMe_2O)_8SiMe_2$, $(Me_2N)_2SiMe_2$, $(Me_2N)SiMe_3$ $(Me_2N)(SiMe_2O)_{20}SiMe_3$, $(Me_2N)_2(SiMe_2O)_{35}SiMe_2$ $(Me_2N)(SiMe_2O)_{28}SiMe_3$ and the like. If desired, mixtures of such dialkylamino compounds can be employed.

The relative amounts of the organosiloxane liquid polymer or other non-aqueous liquid, the inorganic filler and the dialkylamino organosilicone fluid employed in the novel compositions of this invention are not narrowly critical. Typical ranges of amounts of these respective materials include preferably about 70 to about 99 weight percent of the organosiloxane liquid polymer or non-aqueous liquid, and preferably about 0.5 to about 29.5 weight percent of the dialkylamino organosilicone fluid. Preferably, the amount of dialkylamino organosilicone fluid is at least sufficient to provide enough dialkylamino groups, $R_2N$—, to react with substantially all of the hydroxyl group content in the filler as chemically bonded thereto or absorbed thereon in the form of water. It is a relatively simple matter to determine the amount of hydroxyl content in the filler. For example, the dialkylamino organosilicone fluid is permitted to react in large excess with a measured quantity of filler dispersed in the organosiloxane liquid polymer or other non-aqueous oil in an inert atmosphere at room temperature for 15 minutes to 5 or 6 hours to ensure the reaction of substantially all of the hydroxyl group content of the filler. The total amount of dialkyl amine evolved is measured quantitatively and from this amount the hydroxyl content of the filler being tested is determined. Illustratively, the amount of dialkylamino organosilicone fluid employed in making the compositions of this invention can be sufficient to provide from about 0.01 mol, preferably 1.0 mol, to about 50 mols or more dialkylamino groups per mol of —OH groups on said filler. Molar proportions in the higher ranges do not appear to provide a commensurate advantage and thus ratios up to about 10 mols dialkylamino group per mol of —OH group appear to be adequate for most purposes.

The novel compositions of this invention are readily prepared simply by blending together in any desired order the organosiloxane liquid polymer or other non-aqueous oil, the filler and the dialkylamino organosilicone fluid. Preferably, the filler and organosiloxane liquid polymer or other non-aqueous oil are first mixed together and then the dialkylamino organosilicone fluid is added and mixed therewith. Heating is not necessary although, if desired, it may be employed, especially where R′ is ethyl or propyl. It is believed that after all three or more components have been mixed together, a reaction proceeds at room temperature whereby the hydroxyl content of the filler reacts with the dialkylamino organosilicone fluid chemically bonding said fluid to the filler and releasing dialkyl amine. Illustratively, as applied to a silica filler designated in the following equation as $(\equiv SiOH)_x$, the reaction proceeds as follows:

$(\equiv SiOH)_x + (R'_2N)_x(SiR_2O)_mSiR_2(R)_{2-x}$
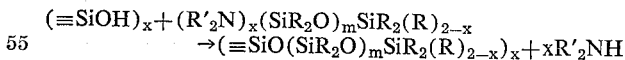
$\rightarrow (\equiv SiO(SiR_2O)_mSiR_2(R)_{2-x})_x + xR'_2NH$ After the blending operation the mixture need not be further processed in any way. The resulting mixture is suitable for immediate antifoam use or can be packaged for shipment. It is possible, however, to subject the resulting mixture to further processing as desired for providing any additional or special effects which may be desired.

It is preferred, although not essential, to remove the dialkyl amine by-product and any unreacted dialkylamino groups from the mixture prior to use or packaging. Alkanol or water can be added to the mixture for the purpose of reacting with any unreacted aminoalkyl groups to form the corresponding dialkyl amine therefrom. Any dialkyl amine present as by-product or formed by subsequent treatment with alkanol or water can be removed by sparging the mixture with an inert gas, such as nitrogen, or by any other suitable means, e.g., thin film evaporation, etc. or simply by allowing the mixture to stand for a sufficient period to permit the dialkyl amine to diffuse out of it. Sparging may be conducted at ambient temperatures or elevated temperatures (especially in the case of diethyl amine or dipropyl amine) by bubbling the inert gas through the mixture at a suitable rate to remove the dialkyl amine within the desired time span.

The filler can be reacted with the dialkylamino organosilicone fluid prior to mixing it with the organosiloxane liquid polymer or other non-aqueous oil. In this case the same proportions of materials and conditions as described above are employed and the same reaction as depicted above is believed to occur. The resulting pretreated filler is then mixed at the desired time with the organosiloxane liquid polymer or other non-aqueous oil in the proportions described above to form the novel antifoam composition.

The following examples are presented to illustrate the invention. Unless otherwise indicated, all parts and percentages are by weight, all temperatures are on the centigrade scale, all viscosities were determined at 25° C., Me designates methyl, and DMA signifies a dimethylamino organosilicone fluid.

EXAMPLE 1

The addition of any material quantity of DMA fluid to a suspension of finely divided silica filler in a liquid organosiloxane polymer improves the antifoam's persistence in aqueous alkaline foamants; however, optimum durability is attained when the molar ratio of dimethylamino end-blocker to reactive —OH in the filler is in excess of 1 to 1.

This was demonstrated using a DMA fluid of the formula $(Me_2N)_x(SiMe_2O)_mSiMe_2(Me)_{2-x}$ in which $x=2$, $m$ is about 5 and total $Me_2N-$ concentration$=18\%$ by weight of the fluid. This fluid was mixed in different proportions as shown in Table I below with 103 parts of a blend consisting of 3 parts silica filler having an average particle diameter of 7 millimicrons and a surface area of 325 m.$^2$/g. and 100 parts by weight of a 500 cstk. dimethylsiloxane polymer, $Me_3SiO(Me_2SiO)_nSiMe_3$, to form antifoam compositions.

Each such composition was tested by the following procedure. In a 100 cc. graduate were placed 49.9 g. of an aqueous carboxylated styrene-butadiene rubber latex having a pH of 10.5, a solids content of 48%, a specific gravity of 1.005, a viscosity of 11 cps. at 25° C. and a surface tension of 37.5 dynes/cm. at 25° C. and 0.1 g. of a suspension of 1.0 g. of one of the above antifoam compositions in 9.0 g. polypropylene glycol diluent having an average molecular weight of 1,950 to 2,100 and a specific gravity of 1.0048. The total volume of liquid was recorded, a stopper inserted in the mouth of the graduate and the graduate shaken vigorously up and down twenty-five times (each change in direction equals one shake). After standing for one minute, the total volume (liquid plus foam) was recorded. The volume of foam produced was determined by subtracting the original liquid volume from the volume after shaking (initial foam). The stoppered graduate was stored at room temperature for one week and again shaken to determine the foam volume after aging. The following results were obtained.

TABLE I

| Ratio, mols NMe$_2$ per mol OH in filler | Foam volume (cc.) | |
|---|---|---|
| | Initial | After aging |
| 0 | 4 | 32 |
| 0.2 | 3 | 11 |
| 0.4 | 4 | 10 |
| 0.6 | 6 | 12 |
| 1.2 | 4 | 8 |
| 2.4 | 3 | 7 |
| 3.6 | 3 | 7 |

The concentration of reactive —OH in the filler was determined by allowing a large excess of the DMA fluid to react with a measured quantity of filler dispersed in dimethylpolysiloxane in an inert atmosphere by sparging at room temperature until no further dimethyl amine came off. The total amount of HNMe$_2$ evolved was determined quantitatively. It was found that the filler contained 6.2 meq active —OH/g. or about 10% by weight reactive —OH based on filler. No distinction was made between active —OH as ≡SiOH and free water tightly held on the silica surface. Theoretically, one mol of free water absorbed on the filler would liberate two mols of dimethyl amine, e.g.,

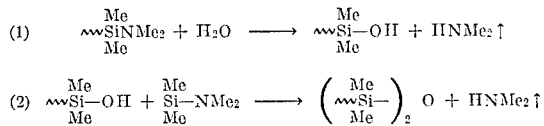

The latex with no antifoam produces 35–40 cc. of foam in this test initially and after aging. The addition of 0.1 g. of the polypropylene glycol diluent to the latex system in this test yields 15 cc. of foam initially and 27 cc. after aging only two days.

EXAMPLE 2

Into 87.7 parts of polypropylene glycol as described in Example 1 was dispersed 0.3 part of an amorphous silica having an average particle diameter of 7 millimicrons and a surface area 325 m.$^2$/g. to form dispersion A. To this dispersion were added 12 parts by weight of a DMA fluid of the type described in Example 1 to form dispersion B.

One hundred milligrams of a dispersion prepared in the same manner as dispersion A were added to 49.9 g. of the latex described in Example 1 and the resulting mixture was tested as in Example 1. The same tests were conducted using 100 mg. of dispersion B. The results tabulated below point out the improvement in durability achieved by the addition of the DMA fluid.

TABLE II

| | Foam volume (cc.) | |
|---|---|---|
| | Initial | After aging 1 week |
| Dispersion: | | |
| A | 13 | ¹ 40 |
| B | 3 | 8 |

¹ After 2 days.

EXAMPLE 3

Three parts of a precipitated silica having an ultimate particle size of 13 millimicrons, a pH of 8.5, a surface area of 300 m.$^2$/g. and a SiO$_2$ content of 98% (anhydrous basis) were dispersed in 100 parts of a 500 cstk. (25° C.) dimethylpolysiloxane to form dispersion C. To this were added 12 parts of the DMA fluid described in Example 1 to form dispersion D.

1.0 gram of a dispersion prepared in the same manner as dispersion C was diluted with 9.0 g. of polypropylene glycol of the type described in Example 1 and 0.1 g. of this diluted antifoam composition was added to 49.9 g of the latex described in Example 1. This procedure was repeated using dispersion D. Both were tested as in Example 1 with the following results:

TABLE III

| | Foam volume (cc.) | |
|---|---|---|
| | Initial | After aging 1 week |
| Dispersion: | | |
| C | 5 | 30 |
| D | 3 | 7 |

EXAMPLE 4

2 parts by weight of an amorphous silica having an average particle size 7 millimicrons, and a surface area of 350 m.$^2$/g. were dispersed in 20 parts of a hydrocarbon oil (Mineral Seal Oil) having in distillation an initial boiling point of 243° C., a 50% boiling point of 299° C., and an end boiling point of 333° C., a flash point of 225° F. and a specific gravity of 0.817 to form dispersion E.

A similar dispersion was prepared and to it was added (at the expense of the hydrocarbon oil), 1 part of the DMA fluid described in Example 1 to form dispersion F. 1.0 gram of a dispersion made in the same manner as dispersion E was dispersed in 9 g. polypropylene glycol diluent described in Example 1 and 0.1 g. of the resulting dilute suspension was added to 49.9 g. of the latex described in Example 1. This was repeated with dispersion F. Both were tested as in Example 1 with the following results:

TABLE IV

| Dispersion: | Foam volume (cc.) | |
|---|---|---|
| | Initial | After aging 3 days |
| E | 13 | 30 |
| F | 3 | 10 |

EXAMPLE 5

Using the same procedure described in Example 1, a DMA fluid having the formula $$(Me_2N)_x(SiMe_2O)_mSiMe_2(Me)_{2-x}$$

in which $x=2$, $m$ is about 41.2, and the total $Me_2N$—concentration is about 2.8% weight of the fluid, was mixed in different proportions as shown in Table V below with a dimethylpolysiloxane oil having a viscosity of 500 cstk, at 25° C. and containing silica having an average particle diameter of 7.0 millimicrons and a surface area of 325 m.²/g. dispersed in the dimethylpolysiloxane oil in the proportion of 3 parts of silica per 100 parts of said oil. The resulting dispersions were tested in the same manner as described in Example 1.

TABLE V

| Ratio mols NMe₂ per mol OH in filler | Foam volume (cc.) | |
|---|---|---|
| | Initial | After aging 1 week |
| 0 | 4 | 32 |
| 0.043 | 5 | 11 |
| 0.108 | 4 | 10 |
| 0.215 | 5 | 12 |
| 0.43 | 5 | 14 |

The total active hydroxyl content of the silica in the oil-silica dispersion was determined by reacting a large excess of the DMA fluid with said dispersion. The hydroxyl content was determined to be approximately 5% based on the filler.

EXAMPLE 6

This example illustrates the pretreatment of a silica filler with a dimethylamino end-blocked poly(dimethylsiloxane) fluid prior to mixing the filler with a silicone oil to produce an antifoam composition of this invention.

(A) Twenty grams of a silica filler having an average particle diameter of 7 millimicrons and a surface area of 325 m.²/g. were mixed with 6 grams of a DMA fluid having the formula $Me_2N(Me_2SiO)_mMe_2SiNMe_2$ and having a viscosity of 5 centistokes at 25° C. The mixture was sparged with nitrogen. A portion (0.6 gram) of the silica so treated was mixed with 20 grams of a dimethylpolysiloxane oil having a viscosity of 500 centistokes at 25° C. and having the formula $Me_3SiO(Me_2SiO)_nSiMe_3$. A portion of the composition so formed (1.0 gram) was admixed with 9.0 g. polypropylene glycol diluent having an average molecular weight of 1,950 to 2,100 and a specific gravity of 1.0048. The resulting suspension was tested in the manner used to test the suspensions described in Example 1 above.

(B) Run A above was repeated using 1.5 grams of the DMA fluid.

(C) Run A above was again repeated using 3.0 grams of the DMA fluid.

The following table shows the results of tests on the suspensions of Runs A, B and C above and also shows the results of tests on a suspension (blank) made similarly but omitting the DMA fluid. The DMA fluid used contained about 18 weight percent dimethylamino groups and the silica had about 5 to 10 weight percent reactive hydroxyl.

TABLE VI

| Suspension tested: | Foam volume (cc.) | |
|---|---|---|
| | Initial | After aging 3 weeks |
| A | 4 | 13 |
| B | 5 | 16 |
| C | 5 | 14 |
| Blank | 4 | 32 |

The antifoam compositions of this invention, especially because of their long term persistence in aqueous foaming systems at alkaline pH, are useful in many appliactions, for example, the preparation and use of aqueous paints, latex systems, cleaning compounds, and laundry and detergent products wherein foaming is not desired. The precise amount of antifoam composition is a matter of choice depending on the degree of antifoam activity desired and on the particular components of the aqueous system and the composition itself. Amounts of antifoam composition in the general range of 100 weight parts per million weight parts of the system (hereinafter referred to as p.p.m.) to 5.0 weight percent based on the weight of the system can be employed. The antifoam compositions can be added to dry materials, such as laundry powders, in the form of dispersions in organic solvent or water followed by drying to provide foam-depressed powders.

What is claimed:

1. An antifoam composition having persistent effectiveness in an aqueous alkaline medium, said composition consisting essentially of a mixture containing (A) about 70 to about 90 weight percent of a substantially non-aqueous liquid having a viscosity of about 5 to about 99,000 centistokes measured at 25° C., selected from the class consisting of an organosiloxane liquid polymer having a ratio of about 1.8 to about 2.2 monovalent hydrocarbon groups free of aliphatic unsaturation per silicon atom, a hydrocarbon oil, a polyalkylene glycol oil, a polyalkylene glycol monether oil, a polyalkylene glycol diether oil, and mixtures thereof, and dispersed in said non-aqueous liquid, (B) about 1.0 to about 30 weight percent of the reaction product of (1) a finely divided inorganic filler selected from the class consisting of silica, aluminum oxide and titanium oxide having a particle size of about 7 millimicrons to about 25 millimicrons and reactive hydroxyl groups on the surface thereof with (2) a dialkylamino organosilicone fluid of the formula:

$$(R'_2N)_x(SiR_2O)_mSiR_2(R)_{2-x}$$

wherein $x$ is an integer of 1 to 2, $m$ is an integer of 0 to 200, R is an alkyl group having 1 to 10 carbon atoms, and R' is an alkyl group having 1 to 3 carbon atoms, said dialkylamino organosilicone fluid being sufficient to provide at least 0.01 mol of dialkylamino groups per mol of said hydroxyl groups on said filler.

2. A composition as defined in claim 1, wherein said filler is silica and R is methyl.

3. A composition as defined in claim 2, wherein the amount of said dialkylamino organosilicone fluid is adequate to provide about 0.01 mol to about 10 mols of dialkylamino group per mol of said hydroxyl group of said filler.

4. A composition as defined in claim 3, wherein said dialkylamino organosilicone fluid and said filler are reacted in such relative amounts as to provide at least about one mol of dialkylamino group, $R'_2N-$, per mol of hydroxyl group of said filler.

5. A composition as defined in claim 4, wherein said dialkylamino organosilicone fluid has the approximate formula: $(Me_2N)_2(SiMe_2O)_mSiMe_2$ wherein $m$ is about 5.

6. A composition as defined in claim 4, wherein said dialkylamino organosilicone fluid has the approximate formula: $(Me_2N)_2(SiMe_2O)_mSiMe_2$ wherein $m$ is about 41.2.

7. A composition as defined in claim 4, wherein said liquid A) is a poly(dimethylsiloxane) oil having a viscosity of about 5 to about 1,000 centistokes at 25° C.

8. A composition as defined in claim 4, wherein said liquid (A) is a hydrocarbon oil.

9. A composition as defined in claim 4, wherein said liquid (A) is polypropylene glycol.

References Cited
UNITED STATES PATENTS

| | | | |
|---|---|---|---|
| 3,455,839 | 7/1969 | Rauner | 252—321 |
| 2,632,736 | 3/1953 | Currie | 252—321 |

JOHN D. WELSH, Primary Examiner

D. SILVERSTEIN, Assistant Examiner

U.S. Cl. X.R.

252—75, 321

PO-1050
(5/69)

UNITED STATES PATENT OFFICE
CERTIFICATE OF CORRECTION

Patent No. 3,560,403  Dated February 2, 1971

Inventor(s) M.J. O'Hara and D.R. Rink

It is certified that error appears in the above-identified patent and that said Letters Patent are hereby corrected as shown below:

In column 8, line 38 (i.e. claim 1, line 4) the number "90" should read ---99---.

In column 8, line 40 (i.e. claim 1, line 6) the number "99,000" should read ---90,000---.

In column 8, line 45 (i.e. claim 1, line 11) term "monether" should read ---monoether---.

In column 9, line 7 (i.e. claim 7, line 2) the designation "A)" should read ---(A)---.

Signed and sealed this 15th day of June 1971.

(SEAL)
Attest:

EDWARD M. FLETCHER, JR.
Attesting Officer

WILLIAM E. SCHUYLER,
Commissioner of Patents